United States Patent [19]

Jones

[11] 4,429,658
[45] Feb. 7, 1984

[54] SEALANT APPLICATOR FOR RIVETS
[75] Inventor: Everett E. Jones, Wichita, Kans.
[73] Assignee: The Boeing Company, Seattle, Wash.
[21] Appl. No.: 291,400
[22] Filed: Aug. 10, 1981
[51] Int. Cl.³ .............................................. B05C 7/00
[52] U.S. Cl. ................... 118/711; 118/408; 118/699; 118/704
[58] Field of Search .............. 118/708, 710, 711, 408, 118/317, 699, 704

[56] References Cited

U.S. PATENT DOCUMENTS

| | | | |
|---|---|---|---|
| 2,426,969 | 9/1947 | Hallowell, Jr. | 118/408 |
| 2,530,199 | 11/1950 | Henson | 118/711 X |
| 2,798,455 | 7/1957 | Beck | 118/408 X |
| 3,614,940 | 10/1971 | Abrams et al. | 118/710 |
| 4,301,698 | 11/1981 | Chaumet | 118/711 X |

*Primary Examiner*—Evan K. Lawrence
*Attorney, Agent, or Firm*—Edwin H. Crabtree

[57] ABSTRACT

A sealant applicator for applying a thin film donut like ring of sealant in and around the top of a rivet hole prior to the installation of a rivet and immediately after the rivet hole has been drilled. The applicator is characterized by having an air operated probe assembly which is held in a retracted position with the center line of the probe displaced from the center line of the rivet hole while the hole is being drilled. Upon the completion of the drilled hole the probe assembly is immediately moved into alignment with the center line of the hole and lowered onto the work piece and a premeasured amount of sealant is uniformly applied to the top of the hole prior to the assembly being retracted and the rivet installed.

8 Claims, 10 Drawing Figures

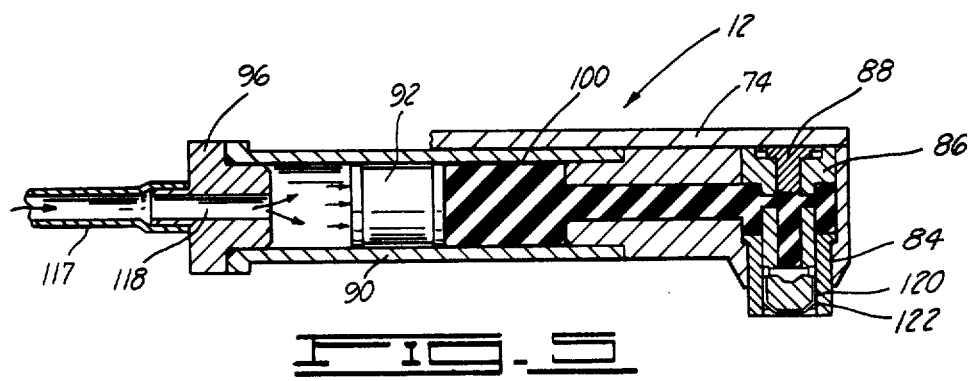
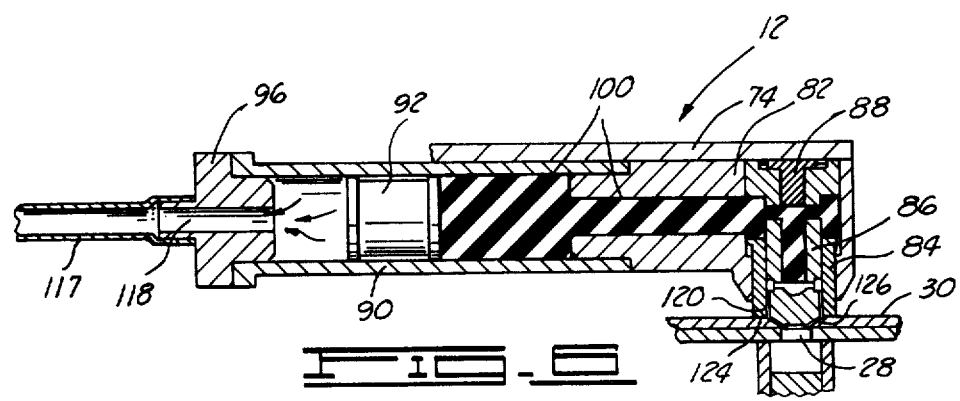
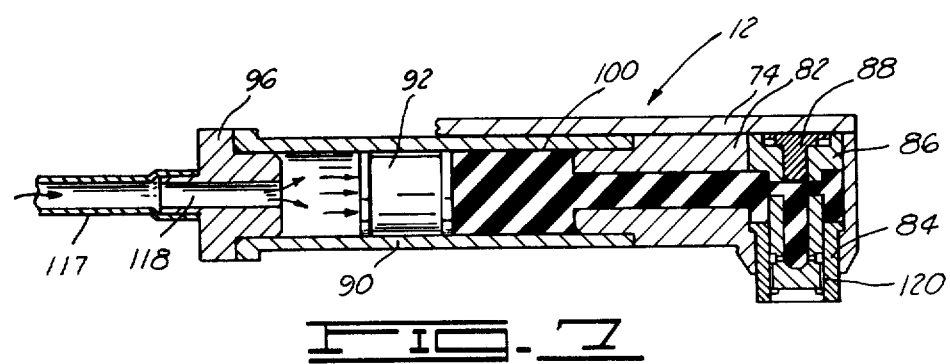
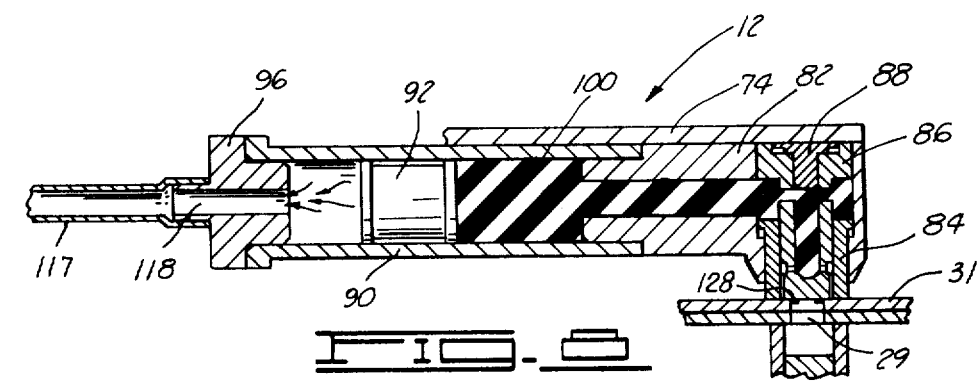

4,429,658

SEALANT APPLICATOR FOR RIVETS

BACKGROUND OF THE INVENTION

This invention applies to a sealant applicator for applying a sealant and more particularly but not by way of limitation to an air operated sealant applicator for applying a ring of sealant in and around the top of a rivet hole prior to installing the rivet.

Heretofore, prior art sealant applicators have delivered uneven amounts of sealant, often in globs, to the top of a rivet hole. When there was too much sealant delivered to the top of the hole, the excess sealant had to be wiped off by hand and the sealant was wasted. If too little sealant was applied to the top of the hole, corrosion would occur around the rivet and the top of the hole because of an inadequate seal.

Also other types of sealant applicators have a tendency to continually drip sealant when not in use causing waste and an unsightly work area in and around the drilling equipment. The applicators of this kind often deliver the sealant from a distance greater than two to three feet from the work piece. The sealant characteristically, in time, increase in this viscosity causing the clogging of the sealant in the delivery lines thereby requiring regular maintenance in the cleaning out the delivery lines and adding fresh sealant. Further, the end of the sealant probe was not protected or covered when the probe was not in use. This caused the sealant to often be wiped on the operator of the equipment or on adjacent equipment again causing waste of the sealant and an unsightly work area. Further, the end of the unprotected probe collected metal chips thereon.

The following patents describe different types of coating and sealing apparatus. None of these patents describe the unique structure and advantages of the subject invention as described herein The patents are:

U.S. Pat. No. 2,216,121 to Legro et al.,
U.S. Pat. No. 3,216,126 to Matheson,
U.S. Pat. No. 3,478,409 to Votow et al.,
U.S. Pat. No. 3,507,438 to Mullin.
U.S. Pat. No. 3,711,347 to Wagner et al.

SUMMARY OF THE INVENTION

The subject sealant applicator provides a means of depositing a thin film of sealant material in and around a rivet hole prior to the installation of the rivet.

The applicator by providing a uniform amount of sealant material in turn provides a barrier to moisture entering the mating surfaces between the rivet and the structure material of the work piece.

The applicator is designed to operate in conjunction with an automatic drilling and riveting machine and more particularly applies the sealant immediately after the rivet hole is drilled and prior to the installation of the rivet. Previous sealant applicators used in conjunction with automatic drilling and riveting machines delayed the normal cycle time of the machine considerably and the application of the sealant was not uniform. The subject invention applies a predetermined amount of sealant and delays the cycle time only five hundred milliseconds.

The invention through electrical controls is designed to interupt the automatic cycle of the drilling and riveting machine after the completion of the drilling cycle. The riveting cycle is arrested until the sealant application is completed. Immediately upon completion of the sealant application the machines riveting cycle is initiated.

Further, the applicator does not drip nor does it apply sealant in uneven globs. Also, the end of the probe applying the sealant is protected when the assembly is not in use. Thereby, preventing contact of the sealant on the operator or on adjacent equipment.

The sealant received inside the probe assembly is adjacent the probe and delivery lines over an extended distance are eliminated. Therefore, it is no longer required to maintain and clean out sealant delivery lines due to the increase in viscosity of the sealant.

The sealant applicator for applying a thin film of sealant in and around a hole prior to the installation of a rivet and immediately after the rivet hole has been drilled includes an air operated probe assembly having a probe mounted therein for dispensing a donut like ring of sealant around the circumference of the rivet hole when the assembly engages the top of the work piece. Further, the air operated probe assembly is connected to an air operated transfer mechanism which moves the probe assembly from a retracted position to a position wherein the center line of the probe in indexed with the center line of the rivet hole. The transfer mechanism then lowers the probe assembly to a position on top of the work piece with the sealant surrounding one end of the probe engaging the top of the rivet hole thereby applying a thin film of sealant therearound. The probe assembly is the retracted by the transfer mechanism to a retracted position where it waits until the sealant is again applied to a newly drilled rivet hole.

The advantages and object of the invention will become evident from the following detailed description of the drawings when read in conjunction with the accompanying drawings which illustrate preferred embodiments of the invention.

BRIEF DESCRIPTION OF THE DRAWINGS

FIGS. 5 and 6 illustrate the probe assembly dispensing a predetermined amount of sealant and applying the sealant to a work area.

FIGS. 7 and 8 illustrate the probe assembly dispensing the sealant for button head rivets.

DETAILED DESCRIPTION OF THE DRAWINGS

Figure 1:
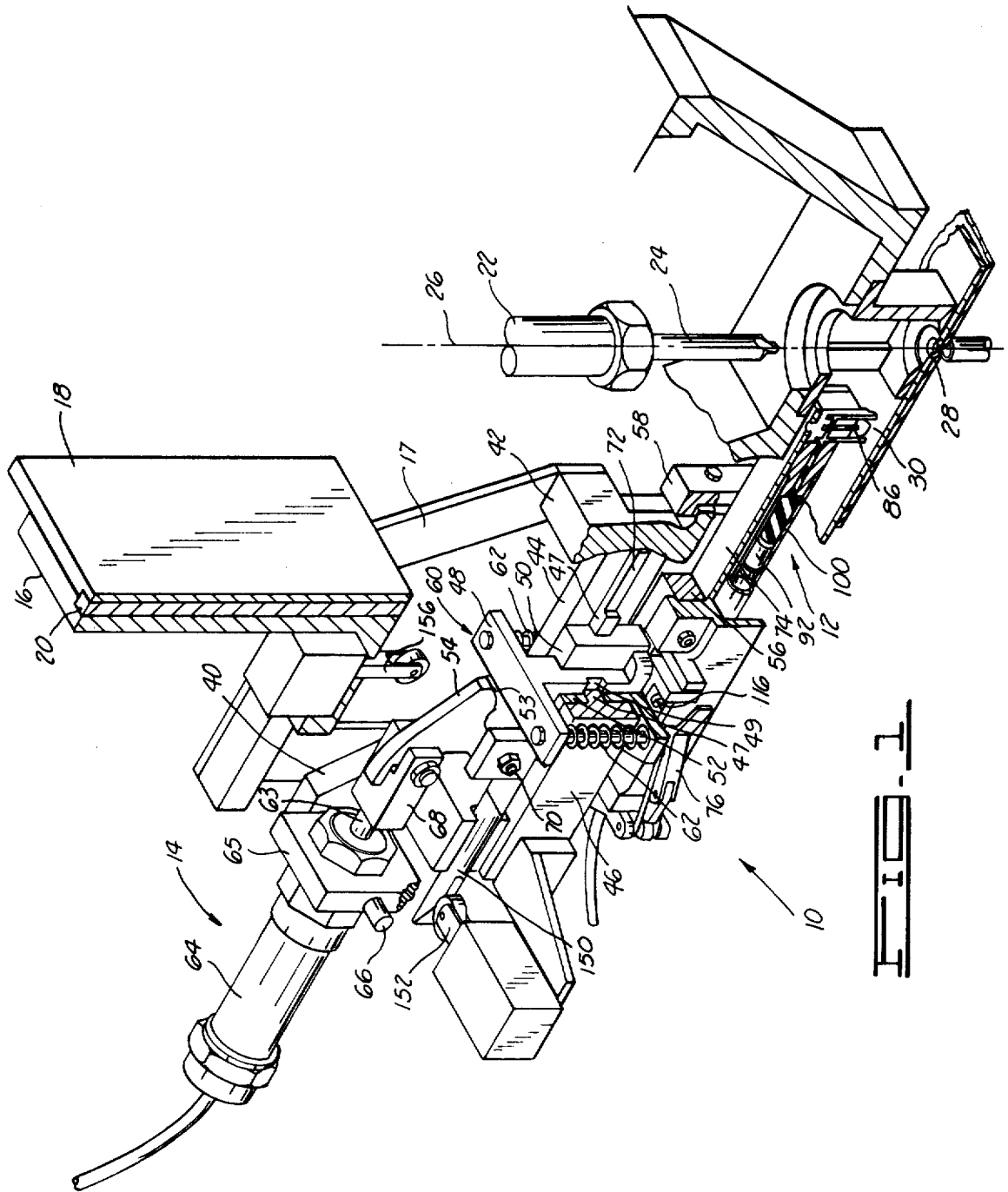
FIG. 1 illustrates the transfer mechanism and probe assembly in a retracted position.
Figure 2:
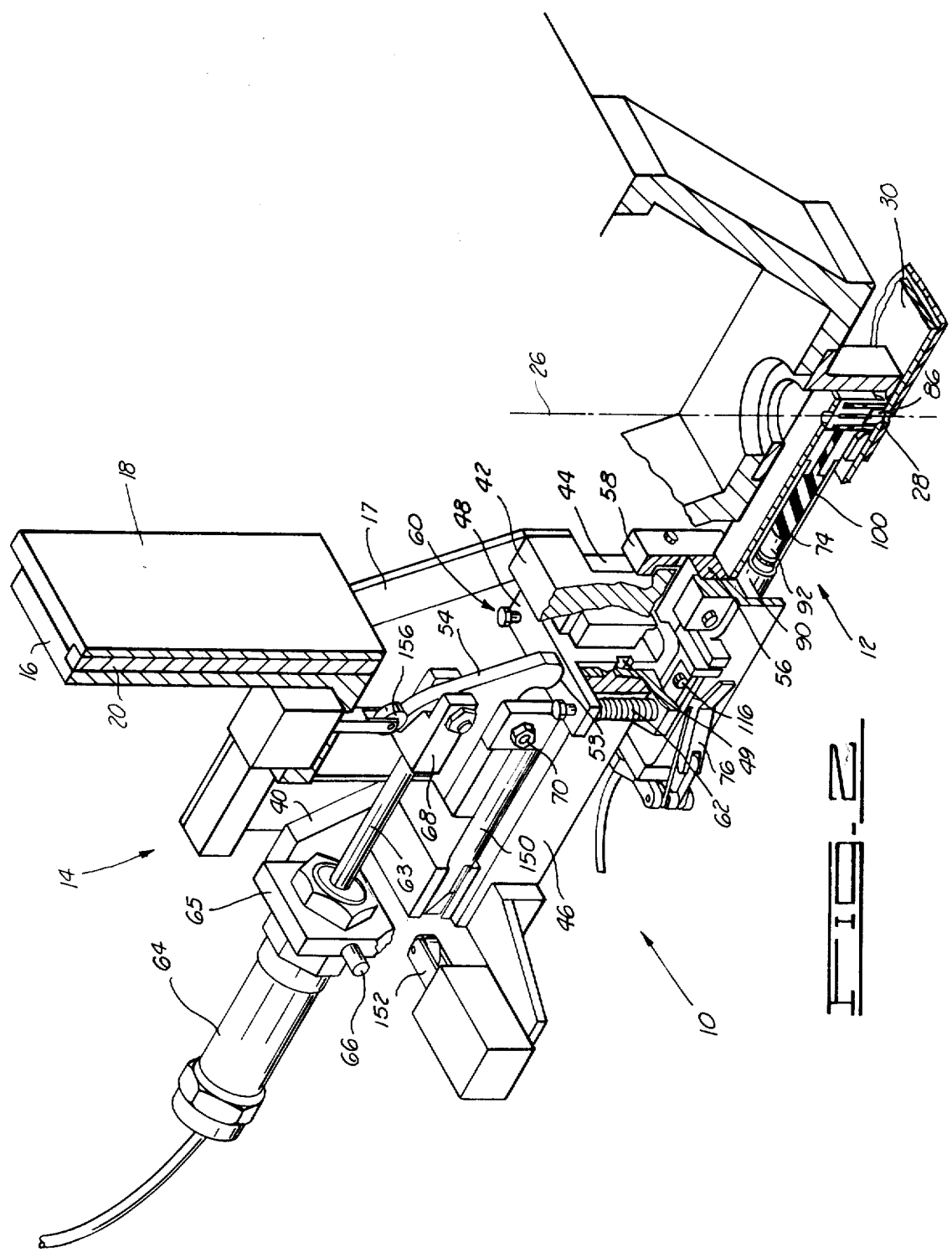
FIG. 2 illustrates the transfer mechanism and probe assembly in a sealant application position.

In FIGS. 1 and 2 the sealant applicator for applying a sealant immediately after a rivet hole is drilled in a work piece is designated by general reference numeral 10. The applicator 10 broadly includes an air operated probe assembly indicated by general reference numeral 12 and a transfer mechanism indicated by general reference numeral 14.

The applicator 10 is secured by support brackets 16 and side supports 17 attached to a base plate 18. The plate 18 is mounted on the side of an automatic drilling machine. The applicator 10 is adjusted vertically by a key 20 which engages base plate 18 and support bracket 16. The drilling machine is not shown in the drawings except for a portion of a drill chuck 22 and a drill 24 having a center line 26 through a drilled hole 28 in a work piece 30. A portion of the bracket 16, side supports 17 and base plate 18 are cut away in FIGS. 1 and 2 to illustrate the applicator 10.

Figure 3:
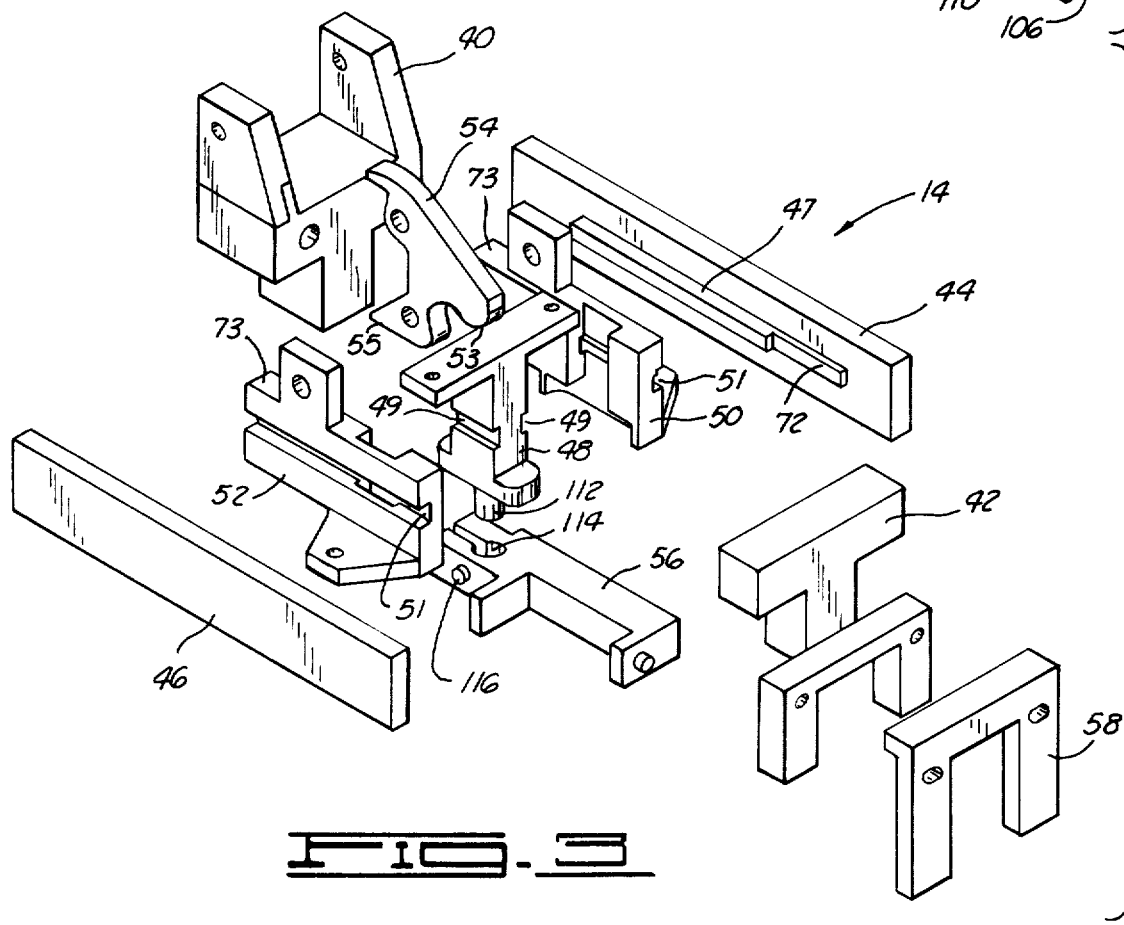
FIG. 3 shows an exploded view of the individual parts of the transfer mechanism.

The transfer mechanism shown in FIGS. 1, 2 and 3 includes end supports 40 and 42, side rails 44 and 46 with guides 47, a plunger 48 with grooves 49, half slides 50 and 52 with grooves 51, a cam 54 with a cam face 53 and a cam stop 55, and a probe assembly retainer 56 with probe assembly guide 58 to hold the probe assembly 12 on line with the center line 26 when sealant is applied to the top of the hole 28.

The plunger 48 with half slides 50 and 52 form a slide assembly designated by general reference numeral 60. The plunger 48 with half slides 50 and 52 are held together by the receipt of the guides 47 in the grooves 49 of the plunger 48 and the grooves 51 of the half slides 50 and 52. It should be noted that the guides 47 extend through the half slides 44 and 46 to engage the grooves 49 of the plunger 48. The engagement of the guides 47 in the grooves 49 hold the plunger 48 in an up position. The plunger 48 is further biased in this "up" position by spring assembly 62 attached to the top of the plunger 48 and the bottom of the half slides 44 and 46. When the applicator 10 is in a retracted position as shown in FIG. 1 the cam face 53 is free from contacting the top of the plunger 48. The side rails 44 and 46 are attached to the end supports 40 and 42 by cap screws which are not shown in the drawings.

An air cylinder 64 with a piston 63 and pivot mount 65 is attached to the end support 40 by pins 66. The piston 63 is attached to the cam 54 by a clevis 68. When air pressure is applied to the piston 63, the cam 54 rotates in a clockwise direction with the cam face 53 engaging the top of the plunger 48 as shown in FIG. 2. The plunger 48 cannot move downwardly because of the engagement of the guides 47 in the grooves 49. The cam 54 is also connected to the slide assembly 60 by a pivot pin 70. Therefore, the piston 63 moves the slide assembly 60 toward the center line 26 until the front of the half slides 50 and 52 engage the end support 42. At this time, because the guides 47 include a cutout 72 therein the plunger 48 is now free to disengage the guides 47 and the plunger 48 is forced downward by the rotation of the cam 54. This rotation is stopped when the piston 63 reaches the end of its stroke. Also at the same time, the spring assembly 62 is compressed downwardly. During this time the probe assembly 12 has moved horizontally into a position which is indexed with the center line 26 and then is moved vertically downward for applying the sealant therein to the top of the hole 28.

When the air in the cylinder 64 is applied to reverse the piston 63, the cam 54 is rotated in a counter clockwise direction until the cam stop 55 engages a back portion 73 shown in FIG. 3 of the half slides 50 and 52. At this time, the cam face 53 is again free from contacting the top of the plunger 48 and the plunger 48 is again in its up position. At the same time the spring assembly 62 aids in moving the plunger 48 in an upwardly direction so the grooves 49 engage the guides 47 as the plunger 48 moves backward into its retracted or rest position.

Figure 4:
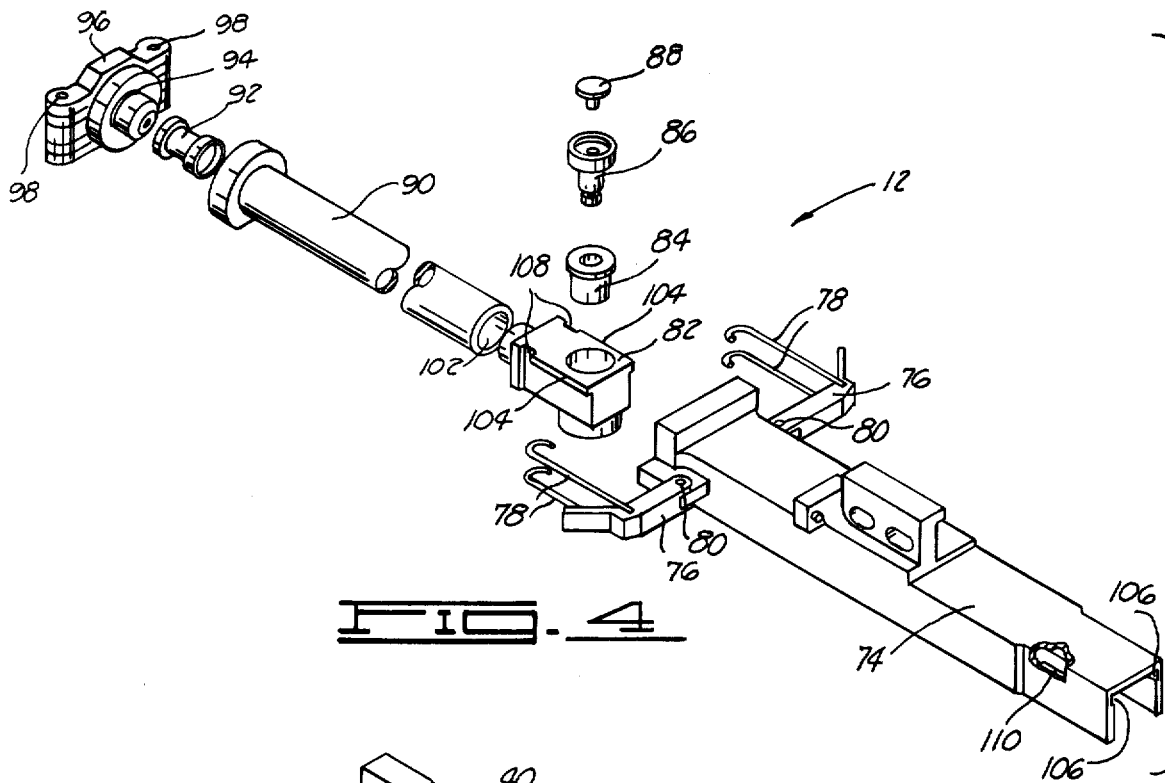
FIG. 4 shows an exploded view of the individual parts of the probe assembly.

The probe assembly 12 shown in FIGS. 1, 2 and 4 include a housing 74, toggles 76, claws 78, pivots 80, probe housing 82, sleeve 84, probe 86, plug 88, cylinder 90, piston 92, "O" ring 94, cylinder end 96 and claw pins 98. A sealant material 100 is loaded into a cylinder bore 102, shown in FIGS. 5 through 8 and filling an area between the piston 92 and the end of the cylinder 90. The plug 88, probe 86 and sleeve 84 are assembled in probe housing 82. The probe housing 82 is attached to the cylinder 90 as shown in FIG. 4. The probe housing 82 is inserted into the housing 74 with ribs 104 on the probe housing 82 engaging grooves 106 in the housing 74. The probe housing 82 is moved forward until flanges 108 on the probe 82 engage stops 110 in the housing 74. The cylinder end 96 is then mounted in the cylinder 90 and claws 78 are engaged around pins 98 and the toggles 76 are retracted and locked around pivots 80. The compressed "O" ring 94 provides an air seal between the cylinder 90 and cylinder end 96.

The probe assembly retainer 56 having a hole 114 therein as shown in FIG. 3 is mounted on a pin 112 at the bottom of the plunger 48. A screw 116 shown in FIGS. 1 and 2 is used to tighten the retainer 56 to the plunger 48.

In FIG. 5 air is applied at a predetermined pressure for a predetermined period of time from an air tube 117 through an air hole 118 to force the piston 92 forward and deliver a premeasured amount of sealant 100 into a cylinder crevice 120 to form a sealant ring 122 adjacent the end of the probe 86 and the inner cylindrical surface of the sleeve 84.

When the probe assembly 12 is moved forward and down to the sealant application position as shown in FIG. 6, the sleeve 84 contacts the top of the work piece 30 providing a seal 124 therebetween. The face of the probe 84 which is tapered to correspond with the counter sunk hole 28 as shown in FIGS. 5 and 6 moves adjacent to the hole and extrudes the sealant ring 122 into a thin film 126 between the tapered portion of the probe and the top of the hole 28 in the work piece 30 and is held thereon by surface tension with the excess of the sealant 100 extruded into the hole 28. The rivet then picks up the excess sealant 100 around its outer circumference as it is received in the hole 28.

When the sleeve 84 in FIG. 6 is forced upwardly by its contact with the work piece 30, the sealant 100 in the cylinder 90 moves backwardly against the piston 92. The air valve at this time is off and the air on the back side of the piston 92 is exhausted to the atmosphere. The sleeve 84 as shown in FIG. 6 remains in an up position until the next sealant dispensing cycle which occurs when the sealant applicator 10 as shown in FIG. 1 is in its rest or retracted position. When the air pressure is again applied the dispensing of the sealant 100 forces the sleeve 84 downwardly in the probe housing 74 and into its bottom position as shown in FIG. 5 for protecting the tapered end of the probe 86.

FIGS. 7 and 8 show the air operated probe assembly 12 which provides the sealant 100 for button head rivets. The sealant 100 is applied as a film 128 to a flat surface around a hole 29 in a work piece 31 rather than a counter sunk hole 28 in the work piece 30 as shown in FIGS. 5 and 6. Otherwise, the process of applying the sealant 100 is the same as described in the description of FIGS. 5 and 6.

Figure 9:
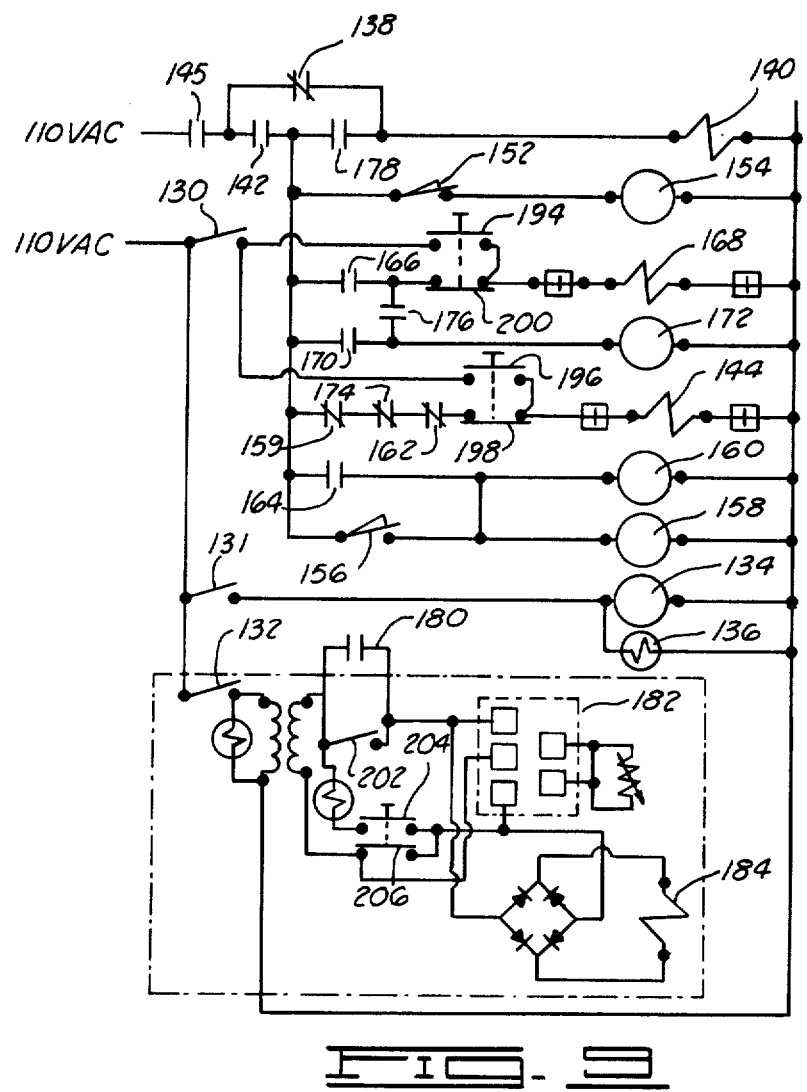
FIGS. 9 and 10 illustrate circuits for electrically operating the automatic sealant dispensing controls.

In FIG. 9 to enter the sealant applicator 10 into the automatic sequence of the drilling and riveting machine cycle, switches 131 and 132 must be closed. Switch 131 provides a circuit to relay coil 134 and indicator light 136. The energized relay coil 134 opens contacts 138 breaking a direct circuit to the drilling and riveting machines rivet insertion and drive solenoid coil 140. The energized relay coil 134 also closes contacts 142 setting up the circuit for the automatic sealant applicator 10. The closed switch 132 provides a circuit to the automatic sealant dispensing controls. These controls are commercially available and only the pertinent functions are described herein.

When the machines automatic rivet cycly is electrically initiated, relay contact 145 is closed as part of the automatic drilling and riveting machines sequence. The closed contact 145 provides a circuit to solenoid 144 and air valve 146 shown in FIG. 10. The energized solenoid 144 directs air to the back side of the piston 63 shown in FIGS. 1 and 2 mounted inside the cylinder 64. Air pressure at the back side of the piston 63 drives the transfer mechanism 14 rearwardly into its normal rest position. In this position a cam rod 150 attached to the slide assembly 60 closes a mechanically closed switch 152 shown in FIG. 1 thereby breaking the circuit to provide the necessary time to operate relay coil 154 before it begins operation. The forward movement of the piston 63 causes the cam 54 as shown in FIG. 2 to close a switch 156 as shown. The closed switch 156 provides a time delay to operate relay coil 158 opening normally closed contact 159 and operating relay coil 160. Relay coil 160 opens normally closed contact 162 and closes contact 164. The closed contact 164 provides a holding circuit to relay coils 158 and 160 until the sealant applicator 10 and automatic riveting machines sequence is completed and the contact 145 is then opened.

The open contact 162 de-energized solenoid 144. The energized time delay to operate relay coil 158 closes contact 166 which provides a circuit to solenoid 168 of the valve 146. By directing air to the front side of the piston 63, the sealant applicator 10 is moved rearwardly to its retracted or rest position. The retraction of the applicator 10 disengages the cam 54 from the switch 156 and opens it. The fully retracted applicator 10 causes cam rod 150 as shown in FIG. 1 to close switch 152 providing a circuit to time delay and operate relay coil 154 which closes contacts 170 to provide a circuit to relay coil 172 and open contact 174 to contact 162. The energized relay coil 172 closes contact 176 re-energizing solenoid 168 assuring that the applicator 10 is held in its retracted position when contact 178 is closed simultaneously by coil 172. The closed contact 170 provides a circuit to solenoid 140 which initiates the rivets insertion sequence of the machine. When the sequence is completed contact 145 is opened.

When the time delay to operate relay coil 154 is energized, contacts 180 are closed to start the recharging of the sealant dispensing circuit and probe assembly 12 as shown in FIGS. 5 through 8. The closed contact 180 provides a circuit through a timing circuit 182 to solenoid 184 to open air valve 186 to direct air to the back side of the piston 92 in cylinder 90 as shown in FIG. 10 and extrude the sealant ring 122 shown in FIGS. 5 and 7 around the probe 86 for the next sealant application.

Figure 10:
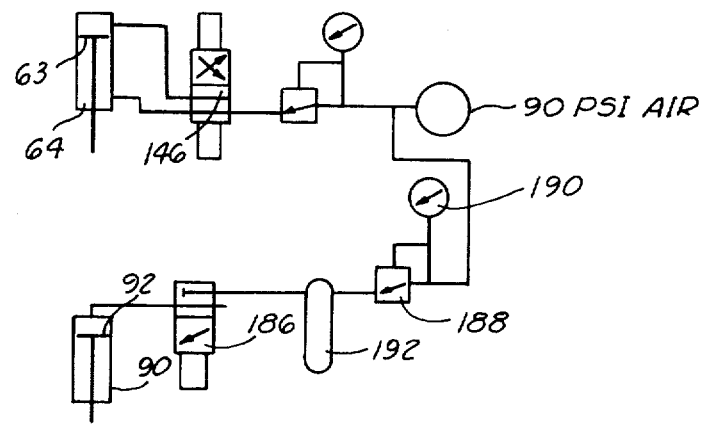

The air pressure and volume to valve 186 in FIG. 10 is controlled by regulator 188 and set to a gage 190. The air volume is assured by accumulator 192. The fine control of the probe assembly 12 is assured by the short distance from the air valve 186 to the cylinder 90 because the air pressures used are in a range of 8 to 9 pounds per square inch and these pressures are applied to piston 92 for approximately 300 milliseconds. The accumulator 192, air valve 186 and cylinder 90 shown in FIG. 10 must be adjacent to each other if a fine control of the sealant 100 is to be dispensed.

To manually operate the sealant applicator switches 130, and 132 shown in FIG. 9 are closed. Switch 130 provides a circuit to switches 194 and 196. When the switch 196 is closed, switch 198 is open. When switch 196 is closed, solenoid 144 of the valve 146 is energized and the air on the back side of the piston 63 pushes the sealant applicator 10 forward.

To manually retract the sealant applicator 10 the switch 194, FIG. 9, is closed to energize solenoid 168 of the valve 146 to direct air to the front side of the piston 63. When switch 194 is closed, switch 200 is open. Switch 202 sets up the time relay circuit when switches 204 and 206 are closed and solenoid 184 and valve 186 will apply air to piston 92 to dispense a predetermined amount of the sealant 100.

Changes may be made in the construction and arrangement of the parts or elements of the embodiments as described herein without departing from the spirit or scope of the invention defined in the following claims.

What is claimed is:

1. A sealant applicator for rivets, the applicator used for applying a sealant to a rivet hole immediately after a rivet hole is drilled in a work piece and prior to installing the rivet, the applicator comprising:
   an air operated probe assembly having a probe mounted therein for moving adjacent to the circumference of the top of the rivet hole of the work piece and leaving a thin film of sealant thereon and between the probe and the circumference when the assembly engages the top of the work piece; and
   means for moving the probe assembly for a retracted position with the center line of the probe displaced from the center line of the rivet hole to a position where the center line of the probe is indexed with the center line of the rivet hole, lowering the assembly to engage the top of the work piece and returning the assembly to the retracted position when the sealant has been dispensed by the probe.

2. The applicator as described in claim 1 wherein the probe assembly includes a cylinder with one end connected to an air pressure supply for delivering a predetermined amount of pressurized air thereto, a free floating piston in the cylinder, the opposite end of the cylinder used for receiving a supply of sealant therein, a probe housing attached to the opposite end of the cylinder with the probe mounted therein for receiving the sealant from the cylinder when pressure is applied to the sealant in the cylinder by the piston and dispensing the sealant between the inner circumference of a sleeve mounted in the probe housing and the outer circumference of one end of the probe.

3. The sealant applicator as described in claim 2 wherein the sleeve mounted in the probe housing is movable therein and extends past the end of the probe applying the sealant when air pressure is applied to the air cylinder, the sleeve moving upwardly into the probe housing when contacting the work piece allowing the sealant on the end of the probe to contact the circumference of the top of the drilled hole.

4. The sealant applicator as described in claim 2 wherein the end of the probe dispensing the sealant is tapered so it corresponds with the taper of a countersunk drilled hole.

5. The probe assembly as described in claim 2 wherein the end of the probe dispensing the sealant is flat so it corresponds with a flat surface of a drilled hole that is not countersunk.

6. A sealant applicator for rivets, the applicator used for applying a sealant to a rivet hole immediately after a rivet hole is drilled in a work piece and prior to installing the rivet, the applicator comprising:
- an air operated probe assembly having a cylinder with one end connected to an air pressure supply for delivering a predetermined amount of pressurized air thereto, a free floating piston in the cylinder, the opposite end of the cylinder used for receiving a supply of sealant therein, a probe housing attached to the opposite end of the cylinder with the probe mounted therein for receiving the sealant and for moving adjacent to the circumference of the top of the rivet hole of the work piece and leaving a thin film of sealant thereon and between the probe and the circumference when the assembly engages the top of the work piece; and
- means for moving the probe assembly from a retracted position with the center line of the probe displaced from the center line of the rivet hole to a position where the center line of the probe is indexed with the center line of the rivet hole, lowering the assembly to engage the top of the work piece and returning the assembly to the retracted position when the sealant has been dispensed by the probe.

7. The sealant applicator as described in claim 6 further including a movable sleeve mounted in the probe housing and surrounding a portion of the probe, the sleeve extending past the end of the probe dispensing the sealant when air pressure is applied to the air cylinder, the sleeve moving upwardly into the probe housing when the sleeve contacts the work piece allowing the sealant on the end of the probe to be applied around the circumference of the top of the drilled hole.

8. A sealant applicator for rivets, the applicator used for applying a sealant to a rivet hole immediately after the rivet hole is drilled in a work piece and prior to installing the rivet, the applicator comprising:
- an air operated probe assembly having a cylinder with one end connected to an air pressure supply for delivering a predetermined amount of pressurized air thereto, a free floating piston in the cylinder, the opposite end of the cylinder used for receiving a supply of the sealant therein, a probe housing attached to the opposite end of the cylinder with a movable sleeve mounted therein and receiving a portion of a probe therein, the sleeve extending past one end of the probe, the probe used for dispensing the sealant when the air pressure is applied to the air cylinder, the sleeve moving upwardly into the probe housing when the sleeve contacts the work piece, the probe moving adjacent to the circumference of the top of the rivet hole and leaving a thin film of sealant thereon when the assembly engages the top of the work piece;
- an air operated transfer mechanism attached to the probe assembly, the transfer mechanism when activated moving the probe assembly from a retracted position perpendicular to and toward the center line of the drilled hole, when the center of the probe in the probe housing is indexed with the center line of the rivet hole, the transfer mechanism lowering the probe assembly so the movable sleeve in the probe housing engages the top of the work piece, when the sealant has been dispensed, the transfer mechanism retracts the probe assembly to its retracted or rest position.

* * * * *